US012342032B2

(12) United States Patent
Yang et al.

(10) Patent No.: US 12,342,032 B2
(45) Date of Patent: Jun. 24, 2025

(54) CONTROL INTEGRATED CIRCUIT FOR MAINTAINING VIDEO OUTPUT TO CONDITIONAL ACCESS MODULE WITH AID OF REFERENCE CLOCK REGENERATION, ASSOCIATED TELEVISION RECEIVER AND ASSOCIATED METHOD (71) Applicant: Realtek Semiconductor Corp., HsinChu (TW)

(72) Inventors: Xiangzhu Yang, Changsha (CN); Xiaomao Zhou, Changsha (CN); Mingrui Li, Changsha (CN); Liupeng Deng, Zhuzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 456 days.

(21) Appl. No.: 17/964,944

(22) Filed: Oct. 13, 2022

(65) Prior Publication Data

US 2023/0336808 A1    Oct. 19, 2023

(30) Foreign Application Priority Data

Apr. 13, 2022  (CN) .......................... 202210384817.8

(51) Int. Cl.
*H04N 21/43* (2011.01)
*H04N 21/418* (2011.01)
*H04N 21/438* (2011.01)
*H04N 21/44* (2011.01)

(52) U.S. Cl.
CPC ..... *H04N 21/4305* (2013.01); *H04N 21/4181* (2013.01); *H04N 21/4383* (2013.01); *H04N 21/44008* (2013.01)

(58) Field of Classification Search
CPC ........... H04N 21/4305; H04N 21/4181; H04N 21/4383; H04N 21/44008; H04N 21/40
See application file for complete search history.

(56) References Cited

U.S. PATENT DOCUMENTS

| 7,027,526 B1* | 4/2006 | Nehoran | H04N 21/40 |
| | | | 348/E5.002 |
| 2015/0181273 A1* | 6/2015 | Shaool | H04N 21/4181 |
| | | | 725/31 |

FOREIGN PATENT DOCUMENTS

CN    103796059 A    5/2014

* cited by examiner

*Primary Examiner* — Vinncelas Louis
(74) *Attorney, Agent, or Firm* — Winston Hsu (57) ABSTRACT

A control integrated circuit (IC) for maintaining video output to a conditional access module (CAM) with aid of reference clock regeneration, an associated television receiver and an associated method are provided. The control IC may include an input control circuit, a frame processing circuit, a clock control circuit, and an output control circuit. The input control circuit receives a transport stream (TS) data signal from a demodulator circuit, the frame processing circuit performs frame processing operations on the TS data signal to prepare a plurality of frames, the clock control circuit generates a second reference clock signal according to the TS valid signal to be a replacement for a first reference clock signal, and the output control circuit outputs the plurality of frames to the CAM according to the second reference clock signal, to allow the CAM to perform conditional access (CA) control for the television receiver.

10 Claims, 8 Drawing Sheets

CONTROL INTEGRATED CIRCUIT FOR MAINTAINING VIDEO OUTPUT TO CONDITIONAL ACCESS MODULE WITH AID OF REFERENCE CLOCK REGENERATION, ASSOCIATED TELEVISION RECEIVER AND ASSOCIATED METHOD

BACKGROUND OF THE INVENTION

1. Field of the Invention

The present invention relates to digital television, and more particularly, a control integrated circuit (IC) for maintaining video output to a conditional access module (CAM) with aid of reference clock regeneration, an associated television receiver and an associated method.

2. Description of the Prior Art

According to the related art, a Digital Video Broadcasting (DVB) television receiver can use a CAM to decrypt program information, where the CAM can be any product among the respective CAM products of a plurality of manufacturers, to provide options for various decryption algorithms. However, certain problems may occur. For example, a demodulator in the DVB television receiver may generate a set of output signals for representing associated demodulation results. The DVB television receiver may output this set of signals to the CAM so that the CAM can try to decrypt program information, and a clock signals among this set of signals may be a high-speed clock signal having a certain fixed frequency, in particular, the frequency of the high-speed clock signal may be much higher than the data rate of a data signal among this set of signals, which may cause the CAM to operate abnormally, making a displayed picture output by the DVB television receiver be abnormal (e.g., have a mosaic phenomenon). Therefore, there is a need for a novel method and associated architecture to realize a television receiver with reliable control without introducing side effects, or in a way that is less likely to introduce a side effect.

SUMMARY OF THE INVENTION

An object of the present invention is to provide a control IC for maintaining video output to a CAM with aid of reference clock regeneration, an associated television receiver and an associated method, in order to solve the problems mentioned above.

Another object of the present invention is to provide a control IC for maintaining video output to a CAM with aid of reference clock regeneration, an associated television receiver and an associated method, in order to guarantee normal operations of the television receiver.

At least one embodiment of the present invention provides a control IC for maintaining video output to a CAM with aid of reference clock regeneration, where the control IC is installed in a television receiver. The control IC may comprise: an input control circuit; a frame processing circuit, coupled to the input control circuit; a clock control circuit; and an output control circuit, coupled to the frame processing circuit and the clock control circuit. For example, the input control circuit can be arranged to receive a first transport stream (TS) data signal of a first TS from a demodulator circuit in the television receiver, wherein the first TS data signal at least carries video data; the frame processing circuit can be arranged to perform frame processing operations on the first TS data signal according to a predetermined frame size to prepare a plurality of frames corresponding to the first TS data signal; the clock control circuit can be arranged to receive a first TS valid signal of the first TS from the demodulator circuit, and generate a second reference clock signal according to the first TS valid signal to be a replacement for a first reference clock signal generated by the demodulator circuit; and the output control circuit can be arranged to output the plurality of frames to the CAM according to the second reference clock signal, to allow the CAM to perform conditional access (CA) control for the television receiver, wherein the output control circuit outputs the second reference clock signal to the CAM, to make the CAM receive the plurality of frames according to the second reference clock signal rather than the first reference clock signal.

According to some embodiments, the present invention further provides the television receiver comprising the above-mentioned control IC, wherein the television receiver may comprise a tuner circuit and the demodulator circuit. For example, the tuner circuit can be arranged to perform tuning operations according to at least one radio frequency signal to generate at least one modulated signal, wherein the at least one radio frequency signal is received through an antenna of the television receiver; and the demodulator circuit can be arranged to perform demodulating operations on the at least one radio frequency signal to generate the first TS.

At least one embodiment of the present invention provides a method for maintaining video output to a CAM with aid of reference clock regeneration, where the method is applicable to a control IC, and the control IC is installed in a television receiver. The method may comprise: utilizing an input control circuit in the control IC to receive a first TS data signal of a first TS from a demodulator circuit in the television receiver, wherein the first TS data signal at least carries video data; utilizing a frame processing circuit in the control IC to perform frame processing operations on the first TS data signal according to a predetermined frame size to prepare a plurality of frames corresponding to the first TS data signal; utilizing a clock control circuit in the control IC to receive a first TS valid signal of the first TS from the demodulator circuit, and generate a second reference clock signal according to the first TS valid signal to be a replacement for a first reference clock signal generated by the demodulator circuit; and utilizing an output control circuit in the control IC to output the plurality of frames to the CAM according to the second reference clock signal, to allow the CAM to perform CA control for the television receiver, wherein the output control circuit outputs the second reference clock signal to the CAM, to make the CAM receive the plurality of frames according to the second reference clock signal rather than the first reference clock signal.

One of the advantages of the present invention is that, through a carefully designed control mechanism, the control IC, the television receiver, and the method of the present invention can dynamically generate a correct reference clock (e.g., the second reference clock signal), no matter whether the first reference clock signal generated by the demodulator circuit is appropriate. In comparison with the related art, the control IC and the method of the present invention can implement a television receiver with robust control without introducing side effects, or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
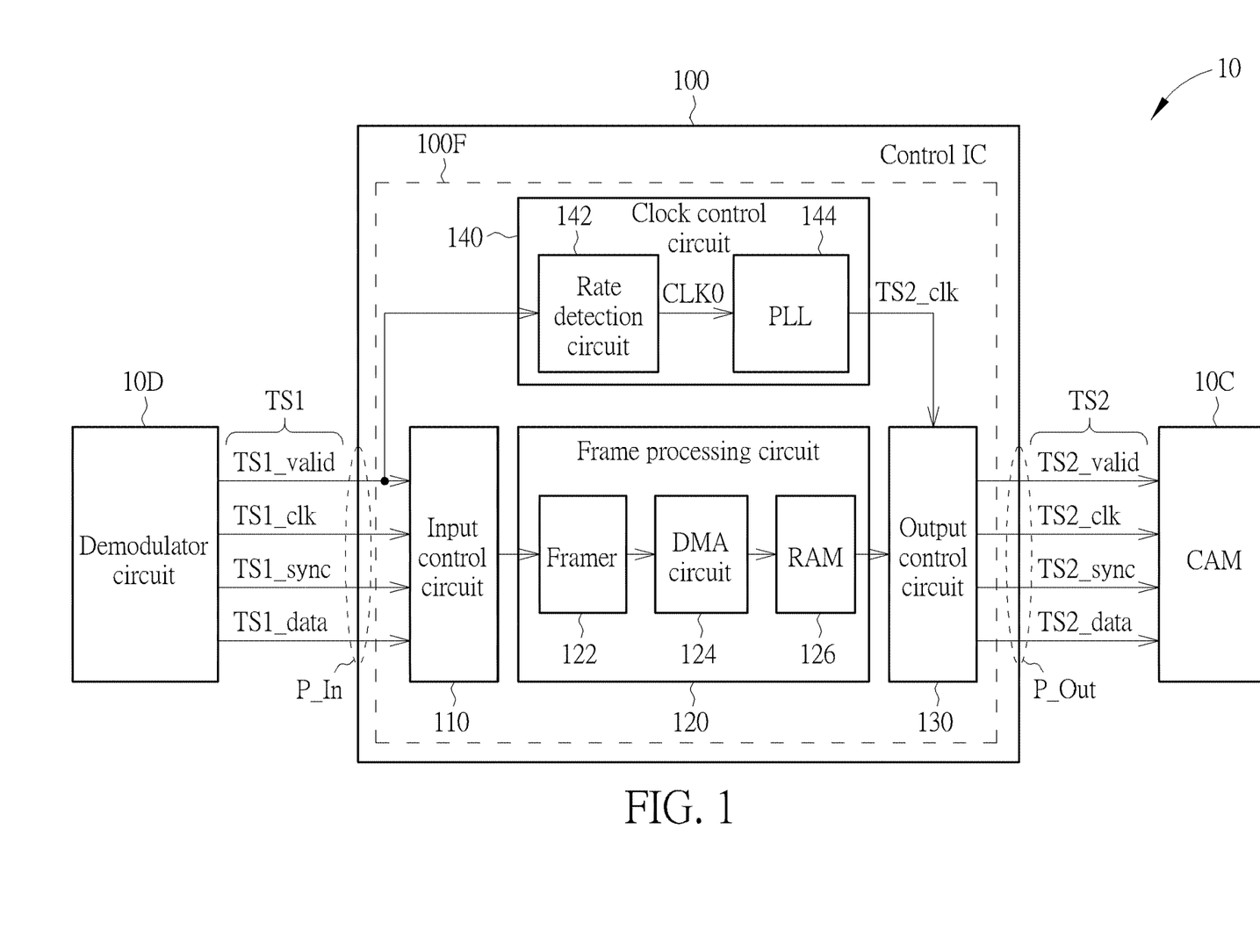
FIG. 1 is a diagram of a control IC for maintaining video output to a CAM with aid of reference clock regeneration according to an embodiment of the present invention, where the CAM and a demodulator circuit in a television receiver comprising the control IC are also illustrated in FIG. 1 for better comprehension.

FIG. 1 is a diagram of a control IC 100 for maintaining video output to a CAM 10C with aid of reference clock regeneration according to an embodiment of the present invention, where the CAM 10C and a demodulator circuit 10D in a television receiver 10 comprising the control IC 100 are also illustrated in FIG. 1 for better comprehension. The control IC 100 installed in the television receiver 10 may comprise a plurality of components such as a TS processing module 100F, etc., and the TS processing module 100F may comprise an input control circuit 110, a frame processing circuit 120, an output control circuit 130 and a clock control circuit 140, where the frame processing circuit 120 may comprise a framer 122, a direct memory access (DMA) circuit 124 and a random access memory (RAM) 126, and the clock control circuit 140 may comprise a rate detection circuit 142 and a phase-locked loop (PLL) 144.

The input control circuit 110 can receive a TS data signal TS1_data of a TS TS1 from the demodulator circuit 10D for further processing, where the TS data signal TS1_data at least carries video data, but the invention is not limited thereto. For example, the TS TS1 may conform to at least one standard of the Moving Picture Experts Group (MPEG), and more particularly, may conform to the MPEG-2 TS (or MPEG2-TS) format of the MPEG-2 standard, and the TS data signal TS1_data can further carry audio data. In addition, the frame processing circuit 120 may perform frame processing operations on the TS data signal TS1_data according to a predetermined frame size PFS (e.g., 188 bytes) to prepare a plurality of frames corresponding to the TS data signal TS1_data. For example, the framer 122 can obtain the plurality of frames from the TS data signal TS1_data at least according to the predetermined frame size PFS such as 188 bytes, and more particularly, identify one frame per 188 bytes from the TS data signal TS1_data. The RAM 126 can temporarily store the plurality of frames, and the DMA circuit 124 can access the plurality of frames, and more particularly, write the plurality of frames obtained by the framer 122 into the RAM 126.

As shown in FIG. 1, the clock control circuit 140 can receive a TS valid signal TS1_valid of the TS TS1 from the demodulator circuit 10D, and generate a reference clock signal TS2_clk according to the TS valid signal TS1_valid to be a replacement clock for a reference clock signal TS1_clk generated by the demodulator circuit 10D. For example, the rate detection circuit 142 can detect the frequency of the occurrence of a predetermined waveform (e.g., a rising/falling edge) on the TS valid signal TS1_valid to generate an intermediate clock signal such as the clock signal CLK0, and the PLL 144 can perform phase locking operations according to the intermediate clock signal such as the clock signal CLK0 to generate the reference clock signal TS2_clk. In addition, the output control circuit 130 can output the plurality of frames to the CAM 10C according to the reference clock signal TS2_clk, to allow the CAM 10C to perform conditional access (CA) control for the television receiver 10, where the output control circuit 130 can output the reference clock signal TS2_clk to the CAM 10C, to make the CAM 10C receive the plurality of frames according to the reference clock signal TS2_clk rather than the reference clock signal TS1_clk.

According to this embodiment, the demodulator circuit 10D is positioned outside the control IC 100. More particularly, the control IC 100 may further comprise an input port P_In and an output port P_Out. The input port P_In can be arranged to receive a plurality of first TS signals of the TS TS1 from the demodulator circuit 10D, where the plurality of first TS signals comprise the TS valid signal TS1_valid, the reference clock signal TS1_clk, a synchronization signal TS1_sync and the TS data signal TS1_data. The output port P_Out can be arranged to output a plurality of second TS signals of a TS TS2 corresponding to the TS TS1 to the CAM 10C, where the plurality of second TS signals comprise a TS valid signal TS2_valid, the reference clock signal TS2_clk, a synchronization signal TS2_sync and a TS data signal TS2_data. The control IC 100 can output the plurality of frames to the CAM 10C through the TS data signal TS2_data.

Based on the architecture shown in FIG. 1, the control IC 100 can dynamically generate a correct reference clock such as the reference clock signal TS2_clk, whether the reference clock signal TS1_clk generated by the demodulator circuit 10D is appropriate. For example, when the frequency of the reference clock signal TS1_clk is much higher than the data rate of the TS data signal TS1_data, the control IC 100 of the present invention can prevent the problems in the related art, such as any error caused by the reference clock signal TS1_clk, the problem of abnormal displayed picture, CAM products compatibility problems, etc.

For better comprehension, the television receiver 10 may be a DVB television receiver, and the CAM 10C may be arranged to perform video decryption for the television receiver 10, to make the television receiver 10 be capable of obtaining decrypted video data in a situation where the video data comprises encrypted video data, wherein the connection, the interaction, etc. between the control IC 100 and the CAM 10C may conform to the DVB Common Interface (CI) standard (DVB-CI standard), but the invention is not limited thereto.

Figure 2:
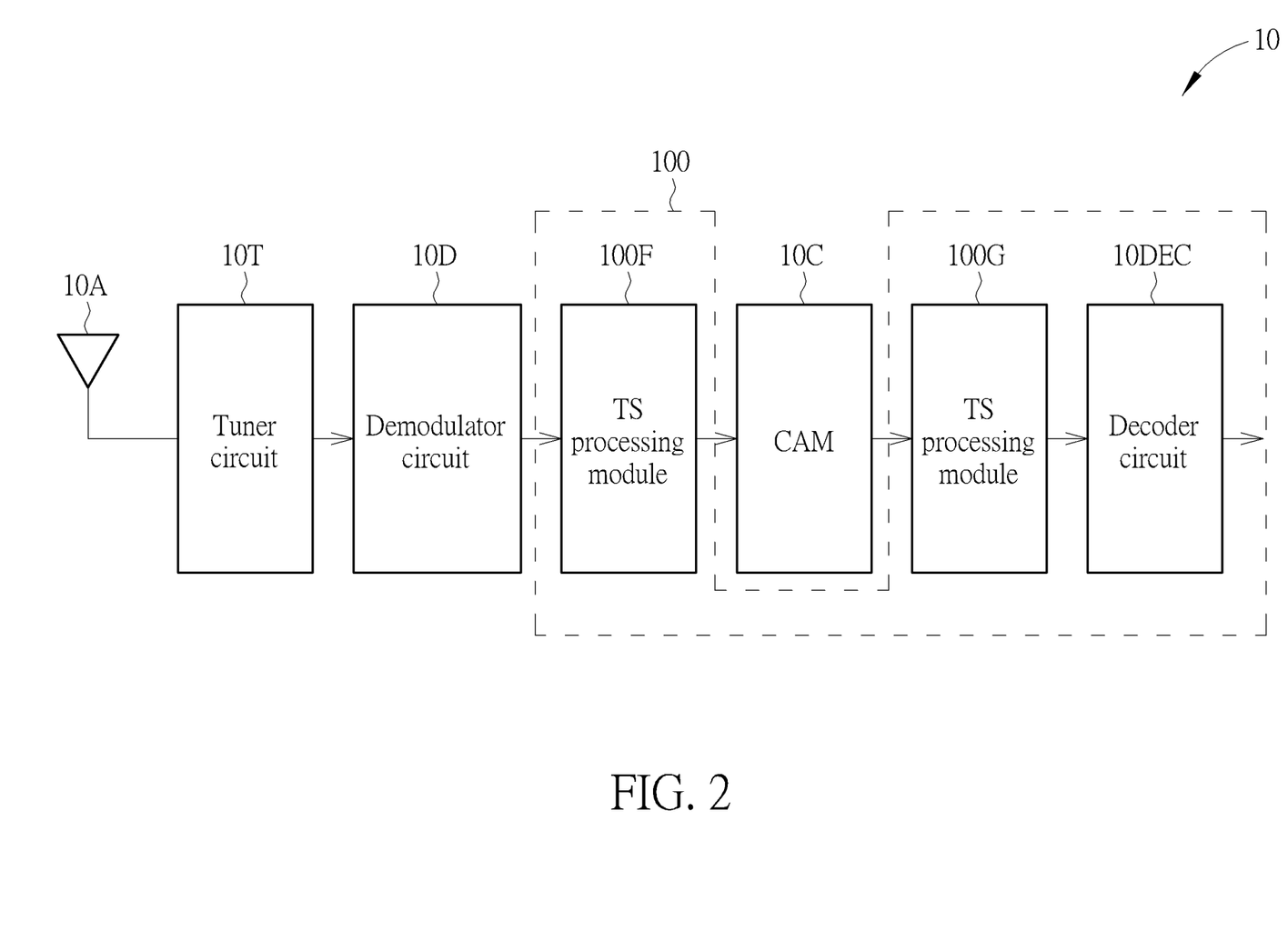
FIG. 2 illustrates some implementation details of the architecture shown in FIG. 1 according to an embodiment of the present invention.

FIG. 2 illustrates some implementation details of the architecture shown in FIG. 1 according to an embodiment of the present invention. As shown in FIG. 2, the control IC 100 may comprise a plurality of TS processing modules such as the TS processing modules 100F and 100G and a decoder circuit 10DEC. For example, the architecture of the TS processing module 100G may be the same as the architecture of the TS processing module 100F, but the present invention is not limited thereto. In some examples, the architecture of the TS processing module 100G may be similar to the architecture of the TS processing module 100F.

The control IC 100 can utilize the output control circuit 130 to output the plurality of frames to the CAM 10C according to the reference clock signal TS2_clk, to allow a multi-stage circuit (e.g., multiple stages of circuits) on a data processing path in the television receiver 10 to perform data processing to generate display data for being displayed. For example, as shown in FIG. 2, the multi-stage circuit may comprise a tuner circuit 10T, the demodulator circuit 10D, the TS processing module 100F, the CAM 10C, the TS processing module 100G and the decoder circuit 10DEC, where the demodulator circuit 10D is the previous stage circuit of the TS processing module 100F, the CAM 10C is the next stage circuit of the TS processing module 100F, the TS processing module 100G is the next stage circuit of the CAM 10C, and the decoder circuit 10DEC is the next stage circuit of the TS processing module 100G.

The tuner circuit 10T can perform tuning operations according to at least one radio frequency signal to generate at least one modulated signal, where the aforementioned at least one radio frequency signal is received through the antenna 10A of the television receiver 10. The demodulator circuit 10D can perform demodulating operations on the aforementioned at least one radio frequency signal to generate the TS TS1. In addition, the display data is decoded display data generated by the decoder circuit 10DEC. For brevity, similar descriptions for this embodiment are not repeated in detail here.

Figure 3:
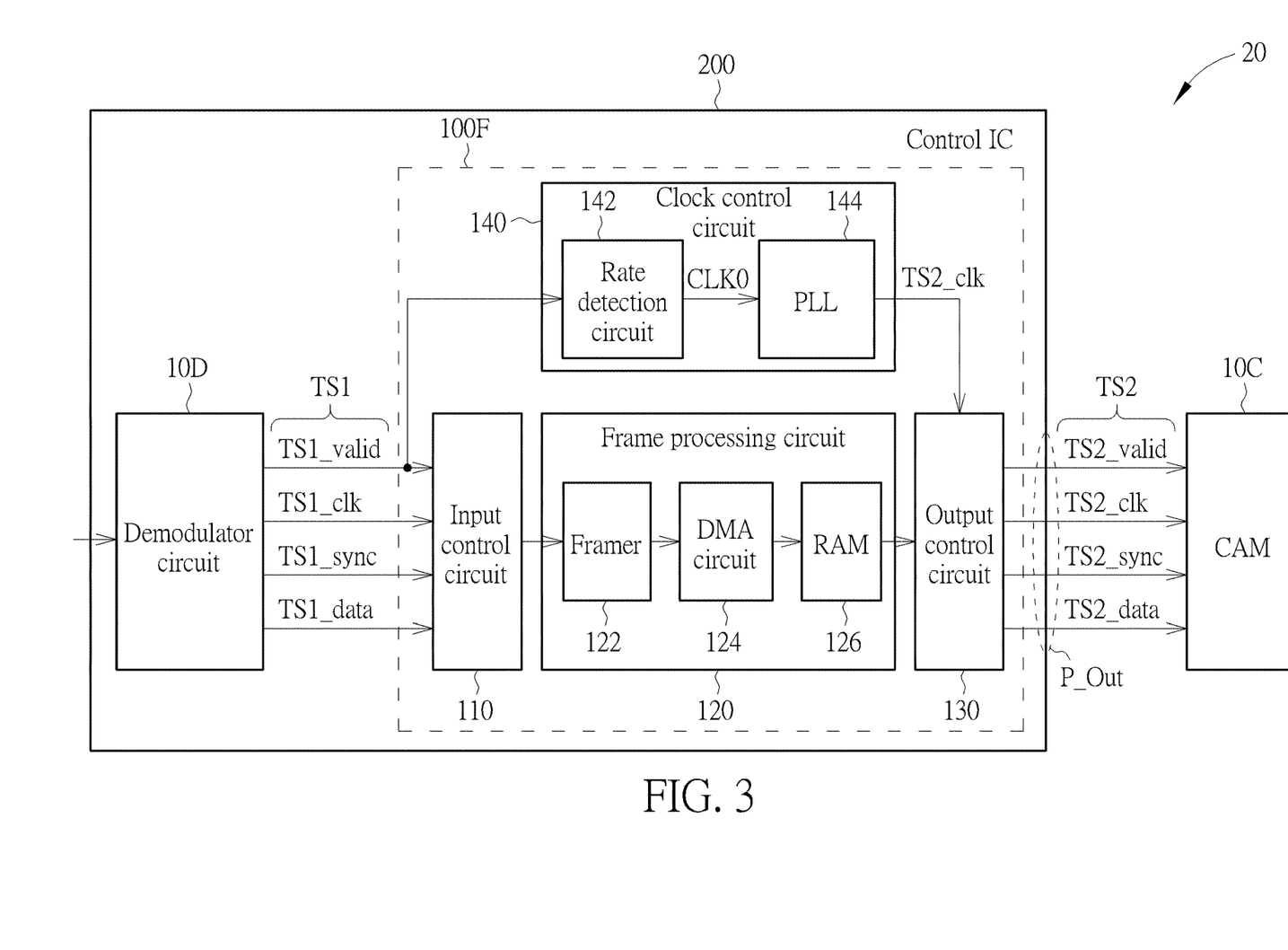
FIG. 3 is a diagram of a control IC for maintaining video output to a CAM with aid of reference clock regeneration according to another embodiment of the present invention, where in comparison with the architecture shown in FIG. 1, the demodulator circuit can be integrated into the control IC in this embodiment.

FIG. 3 is a diagram of a control IC for maintaining video output to the CAM 10C with aid of reference clock regeneration according to another embodiment of the present invention, where in comparison with the architecture shown in FIG. 1, the demodulator circuit 10D can be integrated into the control IC in this embodiment. In response to the change in architecture, the control IC and the television receiver in this embodiment may be referred to as the control IC 200 and the television receiver 20, respectively, where the demodulator circuit 10D is built in the control IC 200. For brevity, similar descriptions for this embodiment are not repeated in detail here.

Figure 4:
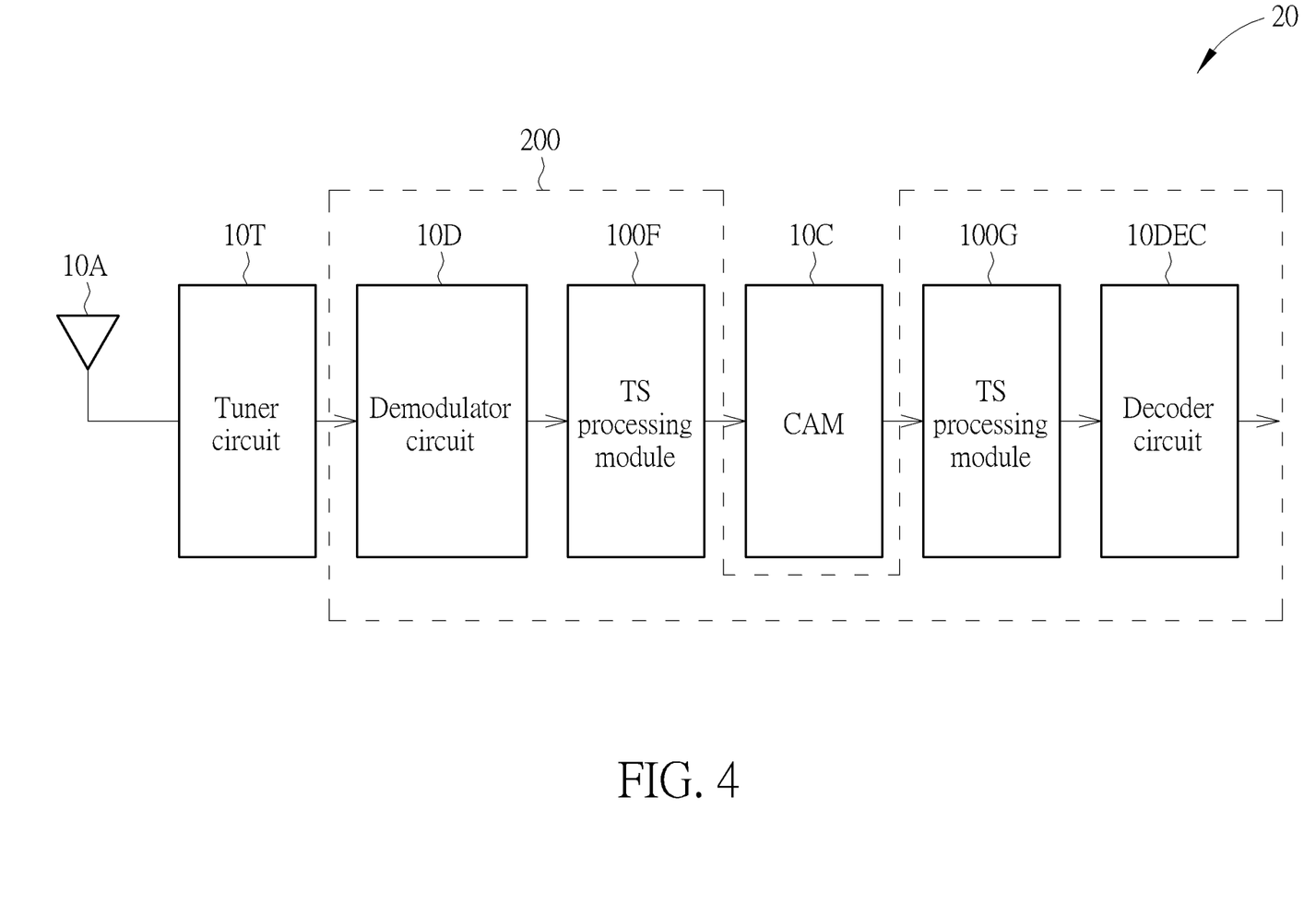
FIG. 4 illustrates some implementation details of the architecture shown in FIG. 3 according to an embodiment of the present invention.

FIG. 4 illustrates some implementation details of the architecture shown in FIG. 3 according to an embodiment of the present invention. As shown in FIG. 4, the control IC 200 may comprise the demodulator circuit 10D, the TS processing modules 100F and 100G and the decoder circuit 10DEC. For brevity, similar descriptions for this embodiment are not repeated in detail here.

Figure 5:
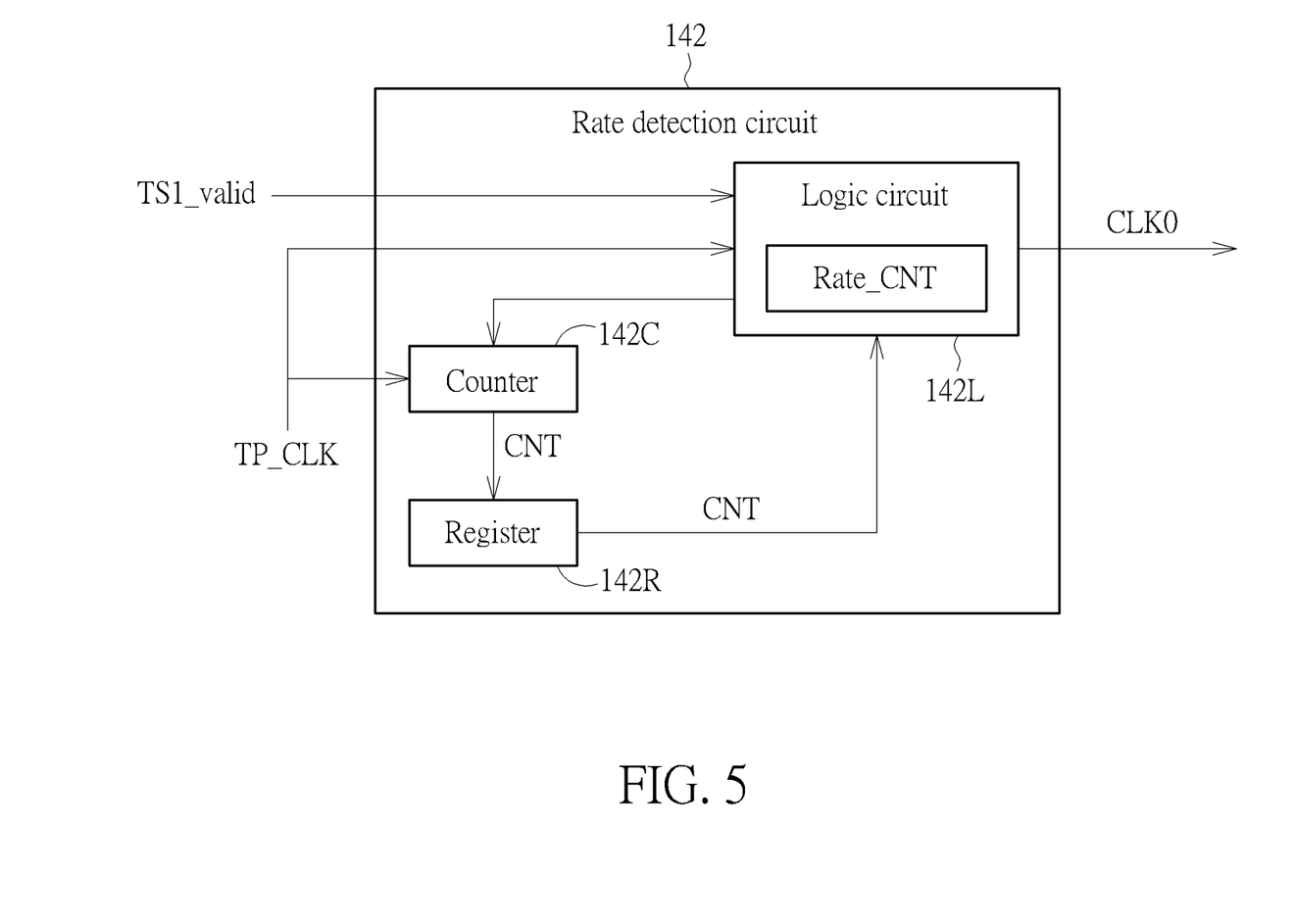
FIG. 5 illustrates some implementation details of the rate detection circuit shown in FIG. 1 according to an embodiment of the present invention.

FIG. 5 illustrates some implementation details of the rate detection circuit 142 shown in FIG. 1 according to an embodiment of the present invention. The rate detection circuit 142 may comprise a logic circuit 142L, a counter 142C and a register 142R. The logic circuit 142L can control the operations of the rate detection circuit 142, the counter 142C can perform counting to generate at least one count value (e.g., one or more count values) such as the count value CNT, and the register 142R can temporarily store the count value CNT. For example, the logic circuit 142L can control the counting operations of the counter 142C according to the TS valid signal TS1_valid to obtain the count value CNT, set at least one parameter (e.g., the rate Rate_CNT) according to the count value CNT, and based on the aforementioned at least one parameter, generate the clock signal CLK0 according to the clock signal TP_CLK, but the invention is not limited thereto.

Figure 6:
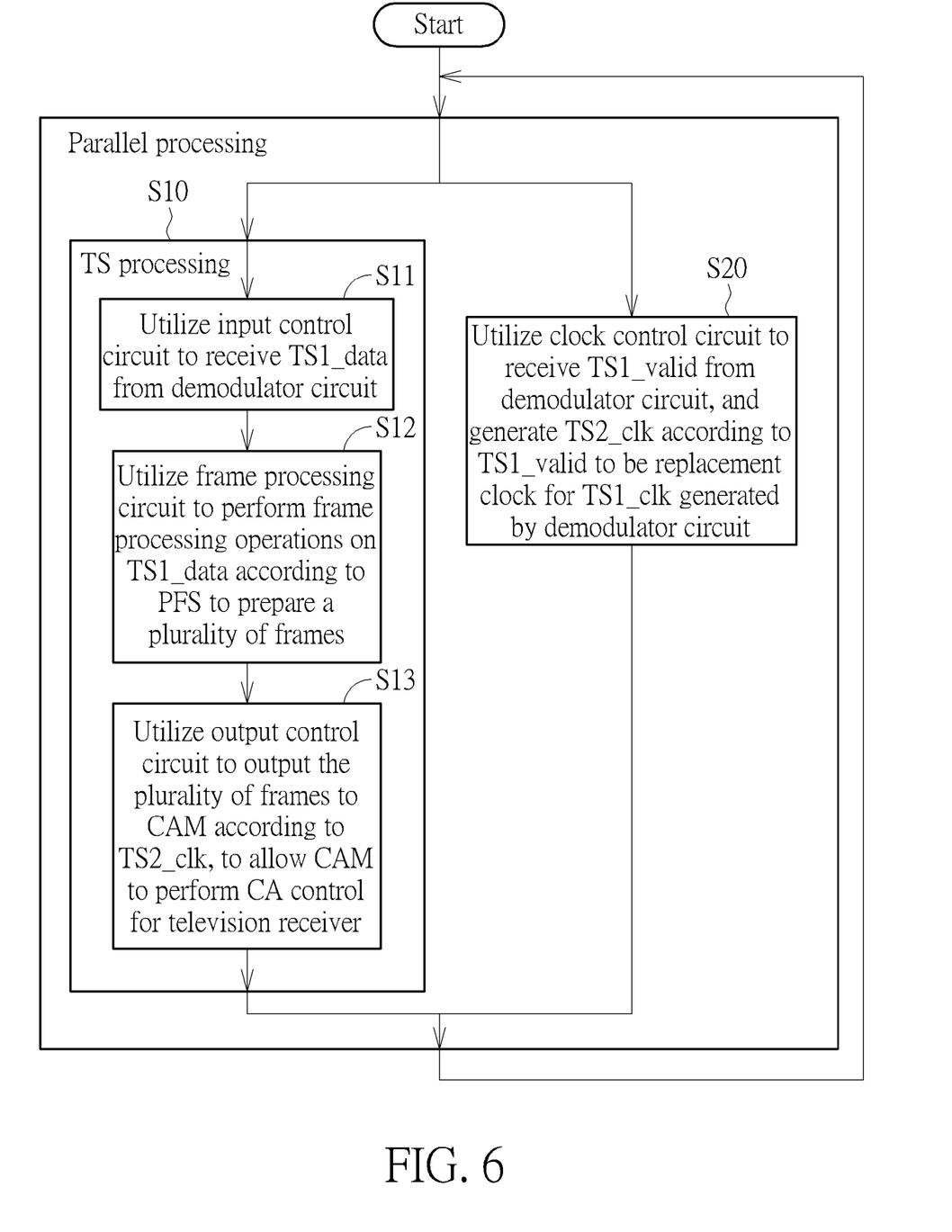
FIG. 6 is a flowchart of a method for maintaining video output to a CAM with aid of reference clock regeneration according to an embodiment of the present invention, where the method can be applied to any control IC among the control ICs respectively shown in FIG. 1 and FIG. 3 and any television receiver among the television receivers respectively shown in FIG. 2 and FIG. 4.

FIG. 6 is a flowchart of a method for maintaining video output to a CAM with aid of reference clock regeneration according to an embodiment of the present invention, where the method can be applied to any control IC among the control ICs 100 and 200 respectively shown in FIG. 1 and FIG. 3 and any television receiver among the television receivers 10 and 20 respectively shown in FIG. 2 and FIG. 4. For example, the control IC 100 (or 200) can perform parallel processing, and more particularly, perform the operations of Steps S10 and S20 in a parallel manner. In addition, under the control of the control IC 100 (or 200), the television receiver 10 (or 20) can utilize the multi-stage circuit such as the tuner circuit 10T, the demodulator circuit 10D, the TS processing module 100F, the CAM 10C, the TS processing module 100G and the decoder circuit 10DEC to perform data processing to generate the display data for being displayed.

In Step S10, the control IC 100 (or 200) can utilize the TS processing module 100F to perform TS processing, where Step S10 may comprise multiple sub-steps such as Steps S11-S13.

In Step S11, the control IC 100 (or 200) can utilize the input control circuit 110 to receive the TS data signal TS1_data of the TS TS1 from the demodulator circuit 10D for further processing, where the TS data signal TS1_data at least carries video data.

In Step S12, the control IC 100 (or 200) can utilize the frame processing circuit 120 to perform frame processing operations on the TS data signal TS1_data according to the predetermined frame size PFS (e.g., 188 bytes) to prepare a plurality of frames (e.g., the plurality of frames mentioned above) corresponding to the TS data signal TS1_data.

In Step S13, the control IC 100 (or 200) can utilize the output control circuit 130 to output the plurality of frames to the CAM 10C according to the reference clock signal TS2_clk, to allow the CAM 10C to perform the CA control for the television receiver 10 (or 20), where the output control circuit 130 outputs the reference clock signal TS2_clk to the CAM 10C, to make the CAM 10C receive the plurality of frames according to the reference clock signal TS2_clk rather than the reference clock signal TS1_clk.

In Step S20, the control IC 100 (or 200) can utilize the clock control circuit 140 to receive the TS valid signal TS1_valid of the TS TS1 from the demodulator circuit 10D, and generate the reference clock signal TS2_clk according to the TS valid signal TS1_valid to be a replacement clock for the reference clock signal TS1_clk generated by the demodulator circuit 10D.

The control IC 100 (or 200) operating according to the method can dynamically generate a correct reference clock such as the reference clock signal TS2_clk, whether the reference clock signal TS1_clk generated by the demodulator circuit 10D is appropriate. For brevity, similar descriptions for this embodiment are not repeated in detail here.

For better comprehension, the method may be illustrated with the working flow shown in FIG. 6, but the present invention is not limited thereto. According to some embodiments, one or more steps may be added, deleted, or changed in the working flow shown in FIG. 6.

Figure 7:
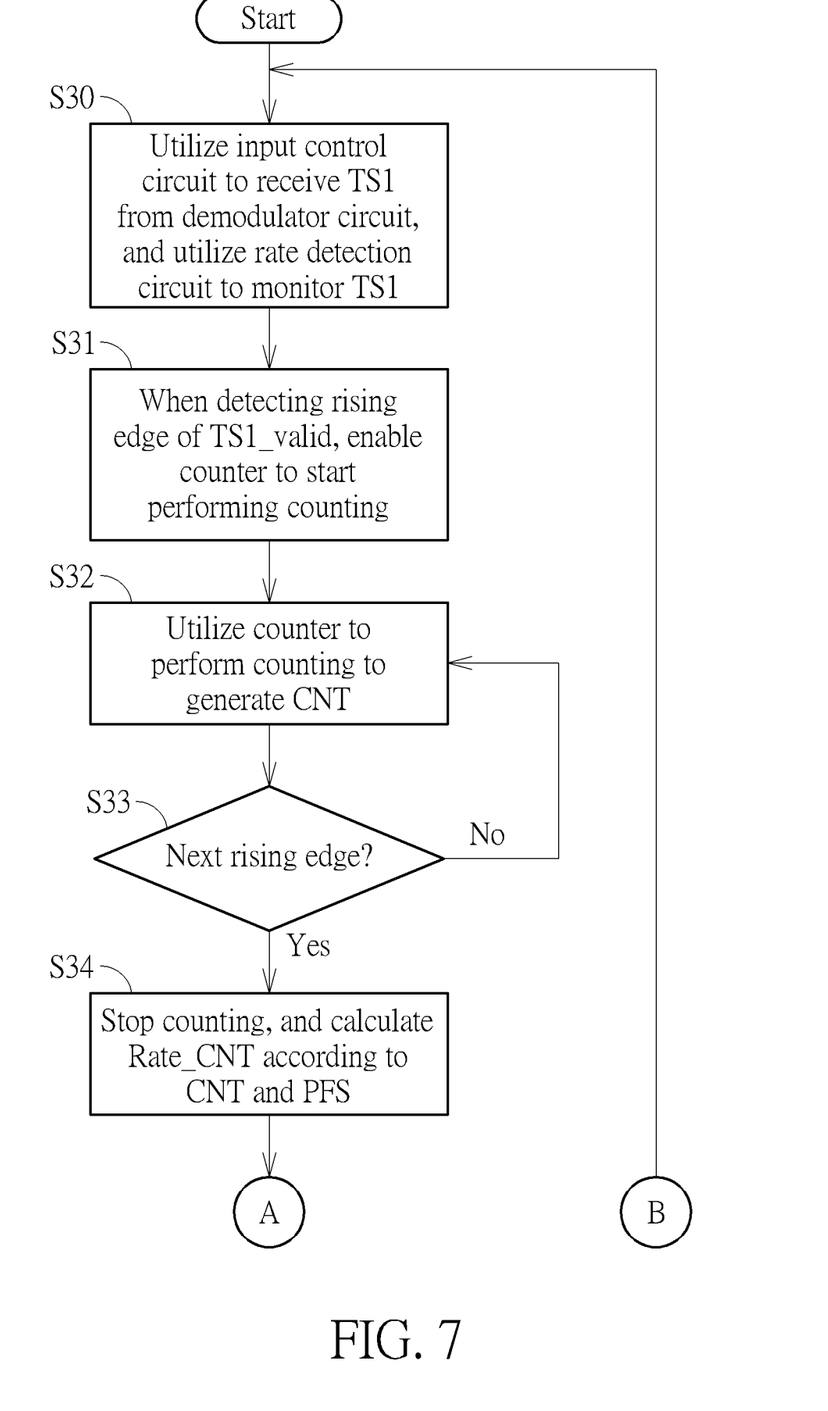
FIG. 7 illustrates a first partial working flow in a working flow of the method according to an embodiment of the present invention.
Figure 8:
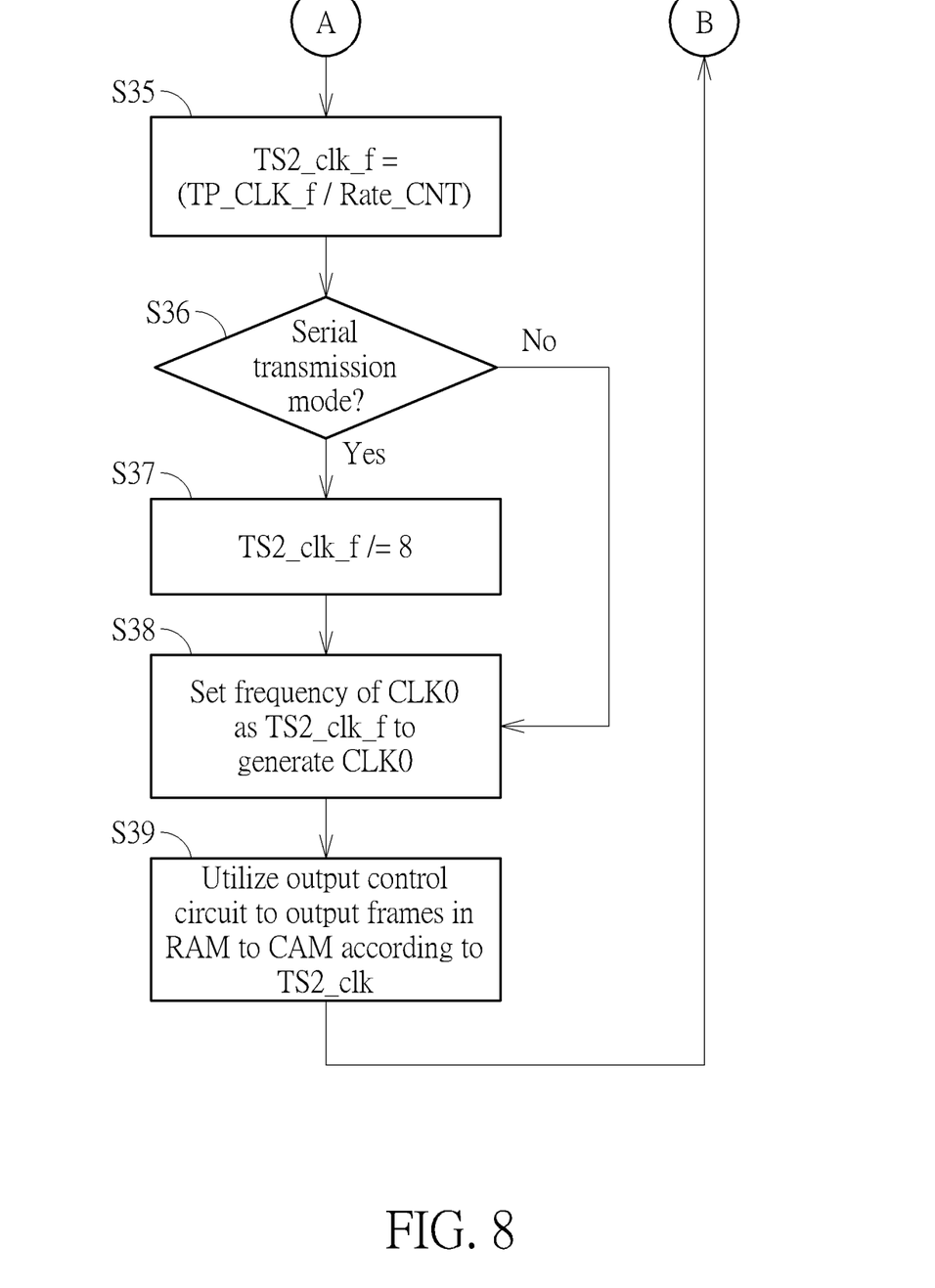
FIG. 8 illustrates a second partial working flow in the working flow of the method.

FIG. 7 and FIG. 8 illustrate a first partial working flow and a second partial working flow in a working flow of the method according to an embodiment of the present invention, respectively, where nodes A and B may indicate the connections between the first partial working flow and the second partial working flow.

In Step S30, the TS processing module 100F can utilize the input control circuit 110 to receive the TS TS1 from the demodulator circuit 10D, and utilize the rate detection circuit 142 (e.g., the logic circuit 142L) to monitor the TS TS1 (e.g., the TS valid signal TS1_valid).

In Step S31, when detecting a rising edge of the TS valid signal TS1_valid, the rate detection circuit 142 (e.g., the logic circuit 142L) can enable the counter 142C to start performing counting.

In Step S32, the rate detection circuit 142 (e.g., the logic circuit 142L) can utilize the counter 142C to perform counting to generate the latest count value such as the count value CNT, for being stored in the register 142R. For example, the counter 142C can perform counting such as the counting operations mentioned above according to the clock signal TP_CLK, and more particularly, count the cycles of the pulses on the clock signal TP_CLK, starting from an initial value such as zero, with an increment such as one.

For better comprehension, the frequency TP_CLK_f (e.g., 250 megahertz, MHz) of the clock signal TP_CLK is typically greater than the frequency TS1_valid_f of the TS valid signal TS1_valid (e.g., when the TS valid signal TS1_valid is active), such as the frequency of the occurrence of two consecutive rising edges on the TS valid signal TS1_valid, and more particularly, may be greater than the frequency TS1_clk_f (not shown in the figure) of the reference clock signal TS1_clk, but the invention is not limited thereto. For example, the TS valid signal TS1_valid may be inactive in certain time intervals, and therefore cannot be directly used as the above-mentioned clock signal CLK0.

In Step S33, the rate detection circuit 142 (e.g., the logic circuit 142L) can check whether the next rising edge of the TS valid signal TS1_valid is detected. If Yes, Step S34 is entered; if No, Step S32 is entered to continue utilizing the counter 142C to perform counting.

In Step S34, the rate detection circuit 142 (e.g., the logic circuit 142L) can stop the counting of the counter 142C, and calculate the ratio Rate_CNT of the latest count value such as the count value CNT to the bit count (PFS*8) of one frame of the TS data signal TS1_data in the TS TS1, and more particularly, calculate the ratio Rate_CNT according to the latest count value CNT and the predetermined frame size PFS (e.g., 188 bytes) as follows:

$$\text{Rate\_CNT}=(CNT/(PFS*8));\text{ or}$$

$$\text{Rate\_CNT}=(CNT/(188*8))=(CNT/1504),\text{ if }PFS=188;$$

where the ratio Rate_CNT can indicate a measurement result obtained by measuring the TS TS1 with the cycle of the clock signal TP_CLK, such as the cycle count per bit of the TS data signal TS1_data, but The invention is not limited thereto.

In Step S35, the rate detection circuit 142 (e.g., the logic circuit 142L) can calculate a temporary value of the frequency TS2_clk_f (not shown in the figure) of the reference clock signal TS2_clk according to the frequency TP_CLK_f of the clock signal TP_CLK and the ratio Rate_CNT as follows:

$$TS2\_clk\_f=(TP\_CLK\_f/\text{Rate\_CNT});$$

wherein according to whether the transport streams TS1 and TS2 are transmitted in the same transmission mode (e.g., a parallel transmission mode or a serial transmission mode), the rate detection circuit 142 (e.g., the logic circuit 142L) can determine whether the frequency TS2_clk_f of the reference clock signal TS2_clk is equal to the above-mentioned temporary value such as (TP_CLK_f/Rate_CNT), and/or whether further adjusting the frequency TS2_clk_f is needed.

For better comprehension, assume that the TS TS2 is transmitted in the parallel transmission mode (rather than the serial transmission mode). The rate detection circuit 142 (e.g., the logic circuit 142L) can determine whether the transport streams TS1 and TS2 are transmitted in the same transmission mode, and more particularly, determine whether the TS TS1 is transmitted in the serial transmission mode, to determine whether further adjusting the frequency TS2_clk_f of the reference clock signal TS2_clk is needed.

In Step S36, the rate detection circuit 142 (e.g., the logic circuit 142L) can determine whether the TS TS1 is transmitted in the serial transmission mode. If Yes, Step S37 is entered; if No, Step S38 is entered.

In Step S37, the rate detection circuit 142 (e.g., the logic circuit 142L) can calculate (e.g., update) the frequency TS2_clk_f of the reference clock signal TS2_clk according to a predetermined ratio (e.g., 8) as follows:

$$TS2\_clk\_f/=8;$$

where the symbol "/=" may represent division assignment.

In Step S38, the rate detection circuit 142 (e.g., the logic circuit 142L) can set the frequency of the clock signal CLK0 to be the frequency TS2_clk_f to generate the clock signal CLK0. For example, the generation of the clock signal CLK0 can be realized by way of clock gating, etc., but the invention is not limited thereto. In addition, the clock control circuit 140 can utilize the PLL 144 to perform phase locking operations according to the clock signal CLK0 to generate the reference clock signal TS2_clk.

In Step S39, the TS processing module 100F can utilize the output control circuit 130 to output the plurality of frames in the RAM 126 to the CAM 10C according to the reference clock signal TS2_clk (e.g., the frequency TS2_clk_f thereof).

For better comprehension, the method may be illustrated with the working flow shown in FIG. 7 and FIG. 8, but the present invention is not limited thereto. According to some embodiments, one or more steps may be added, deleted, or changed in the working flow shown in FIG. 7 and FIG. 8.

According to some embodiments, each frame of the plurality of frames may be regarded as a TS packet, where the TS packet may comprise 188 bytes. The framer 122 may start receiving the data carried by the TS data signal TS1_data in response to a predetermined waveform (e.g., a rising edge) on the synchronization signal TS1_sync, and more particularly, identify one frame per 188 bytes from the data to divide the data into the plurality of frames. When receiving any frame among the plurality of frames, the framer 122 can trigger the DMA circuit 124 to write the any frame obtained by the framer 122 into the RAM 126. In addition, the control IC 100 (or 200) can utilize the rate detection circuit 142 to perform the associated operations in the working flow shown in FIG. 7 and FIG. 8 to determine the time required for transmitting data of a frame (e.g., a TS packet), and more particularly, calculate the actual data rate of the TS signal TS1 (e.g., the TS data signal TS1_data) to be the frequency TS2_clk_f of the reference clock signal TS2_clk. As a result, the output control circuit 130 outputs the plurality of frames in the RAM 126 to the CAM 10C according to the frequency TS2_clk_f of the reference clock signal TS2_clk. For brevity, similar descriptions for these embodiments are not repeated in detail here.

In the embodiments described above, the number of input/output terminals of at least one TS among the transport streams TS1 and TS2 may vary with the transmission mode (e.g., the parallel transmission mode, or the serial transmission mode). For example, for the parallel transmission mode, the input/output terminals of the TS TS1 (or TS2) may comprise:
  (1) a clock terminal, used for the input/output of the reference clock signal TS1_clk (or TS2_clk);
  (2) a synchronization terminal, used for the input/output of the synchronization signal TS1_sync (or TS2_sync);
  (3) a valid terminal, used for the input/output of the TS valid signal TS1_valid (or TS2_valid); and
  (4) eight data terminals, used for the input/output of eight bits of the TS data signal TS1_data (or TS2_data);
where the total number of the input/output terminals listed above is equal to eleven. Additionally, for the serial transmission mode, the input/output terminals of the TS TS1 may comprise:
  (1) a clock terminal, used for the input/output of the reference clock signal TS1_clk;
  (2) a synchronization terminal, used for the input/output of the synchronization signal TS1_sync;
  (3) a valid terminal, used for the input/output of the TS valid signal TS1_valid; and
  (4) a data terminal, used for the input/output of the TS data signal TS1_data;
where the total number of the input/output terminals listed above is equal to four.

According to some embodiments, the RAM 126 may be implemented by way of a dynamic random access memory (DRAM), a static random access memory (SRAM), etc. For brevity, similar descriptions for these embodiments are not repeated in detail here.

The control ICs 100 and 200, the television receivers 10 and 20 and the method of the present invention can dynamically generate a correct reference clock such as the reference clock signal TS2_clk, no matter whether the reference clock signal TS1_clk generated by the demodulator circuit 10D is appropriate. In comparison with the related art, the control IC and the method of the present invention can realize a television receiver with reliable control without or with less side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control integrated circuit (IC) for maintaining video output to a conditional access module (CAM) with aid of reference clock regeneration, the control IC being installed in a television receiver, the control IC comprising:
  an input control circuit, arranged to receive a first transport stream (TS) data signal of a first TS from a demodulator circuit in the television receiver, wherein the first TS data signal at least carries video data;
  a frame processing circuit, coupled to the input control circuit, arranged to perform frame processing operations on the first TS data signal according to a predetermined frame size to prepare a plurality of frames corresponding to the first TS data signal;
  a clock control circuit, arranged to receive a first TS valid signal of the first TS from the demodulator circuit, and generate a second reference clock signal according to the first TS valid signal to be a replacement for a first reference clock signal generated by the demodulator circuit; and
  an output control circuit, coupled to the frame processing circuit and the clock control circuit, arranged to output the plurality of frames to the CAM according to the second reference clock signal, to allow the CAM to perform conditional access (CA) control for the television receiver, wherein the output control circuit outputs the second reference clock signal to the CAM, to make the CAM receive the plurality of frames according to the second reference clock signal rather than the first reference clock signal.

2. The control IC of claim 1, wherein the television receiver is a Digital Video Broadcasting (DVB) television receiver, and the CAM is arranged to perform video decryption for the television receiver, to allow the television receiver to obtain decrypted video data in a situation where the video data comprises encrypted video data.

3. The control IC of claim 1, wherein the clock control circuit comprises:
  a rate detection circuit, arranged to detect a frequency of occurrence of a predetermined waveform on the first TS valid signal to generate an intermediate clock signal; and
  a phase-locked loop (PLL), coupled to the rate detection circuit, arranged to perform phase locking operations according to the intermediate clock signal to generate the second reference clock signal.

4. The control IC of claim 1, wherein the frame processing circuit comprises:
  a framer, arranged to obtain the plurality of frames from the first TS data signal at least according to the predetermined frame size;
  a random access memory (RAM), arranged to temporarily store the plurality of frames; and
  a direct memory access (DMA) circuit, coupled to the framer and the RAM, arranged to access the plurality of frames.

5. The control IC of claim 1, wherein a TS processing module in the control IC comprises the input control circuit, the frame processing circuit and the output control circuit; and the control IC utilizes the output control circuit to output the plurality of frames to the CAM according to the second reference clock signal, to allow a multi-stage circuit on a data processing path in the television receiver to perform data processing to generate display data for being displayed, wherein the multi-stage circuit comprises the demodulator circuit, the TS processing module and the CAM, the demodulator circuit is a previous stage circuit of the TS processing module, and the CAM is a next stage circuit of the TS processing module.

6. The control IC of claim 5, wherein the multi-stage circuit further comprises a decoder circuit and another TS processing module, the other TS processing module is a next stage circuit of the CAM, the decoder circuit is a next stage circuit of the other TS processing module, and the display data is decoded display data generated by the decoder circuit.

7. The control IC of claim 1, wherein the demodulator circuit is built in the control IC.

8. The control IC of claim 1, wherein the demodulator circuit is positioned outside the control IC; and the control IC further comprises:
- an input port, arranged to receive a plurality of first TS signals of the first TS from the demodulator circuit, wherein the plurality of first TS signals comprise the first TS valid signal, the first reference clock signal, a first synchronization signal, and the first TS data signal; and
- an output port, arranged to output a plurality of second TS signals of a second TS corresponding to the first TS to the CAM, wherein the plurality of second TS signals comprise a second TS valid signal, the second reference clock signal, a second synchronization signal and a second TS data signal, and the control IC outputs the plurality of frames to the CAM through the second TS data signal.

9. The television receiver comprising the control IC of claim 1, wherein the television receiver comprises:
- a tuner circuit, arranged to perform tuning operations according to at least one radio frequency signal to generate at least one modulated signal, wherein the at least one radio frequency signal is received through an antenna of the television receiver; and
- the demodulator circuit, arranged to perform demodulating operations on the at least one radio frequency signal to generate the first TS.

10. A method for maintaining video output to a conditional access module (CAM) with aid of reference clock regeneration, the method being applicable to a control integrated circuit (IC), and the control IC is installed in a television receiver, the method comprising:
- utilizing an input control circuit in the control IC to receive a first transport stream (TS) data signal of a first TS from a demodulator circuit in the television receiver, wherein the first TS data signal at least carries video data;
- utilizing a frame processing circuit in the control IC to perform frame processing operations on the first TS data signal according to a predetermined frame size to prepare a plurality of frames corresponding to the first TS data signal;
- utilizing a clock control circuit in the control IC to receive a first TS valid signal of the first TS from the demodulator circuit, and generate a second reference clock signal according to the first TS valid signal to be a replacement for a first reference clock signal generated by the demodulator circuit; and
- utilizing an output control circuit in the control IC to output the plurality of frames to the CAM according to the second reference clock signal, to allow the CAM to perform conditional access (CA) control for the television receiver, wherein the output control circuit outputs the second reference clock signal to the CAM, to make the CAM receive the plurality of frames according to the second reference clock signal rather than the first reference clock signal.

* * * * *